Dec. 24, 1940.     J. DICHTER     2,226,303
VIAL FORMING MACHINE
Filed June 21, 1938     2 Sheets—Sheet 1
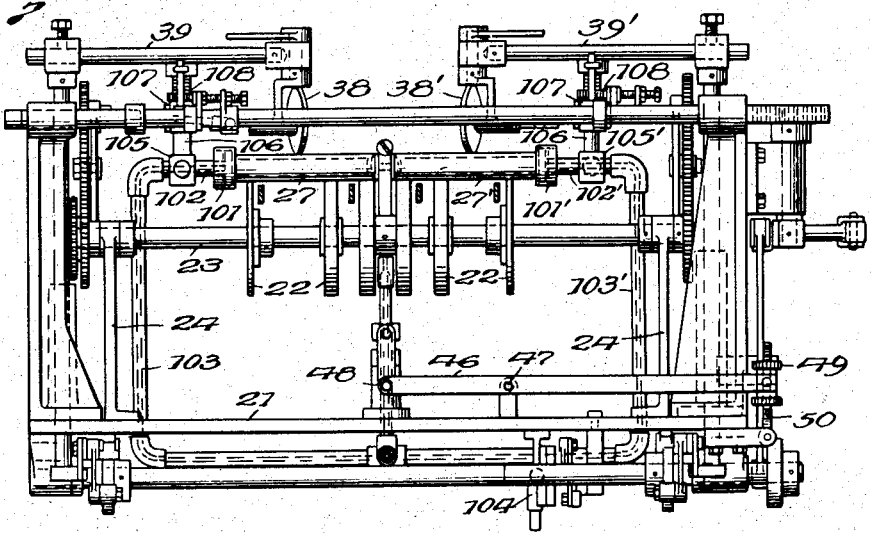
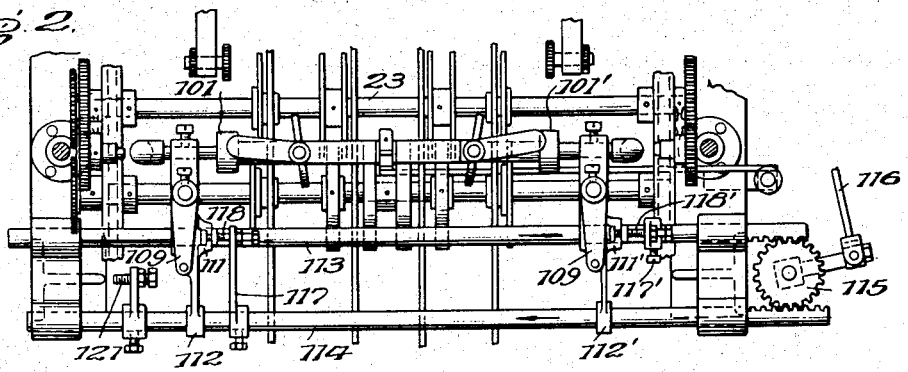
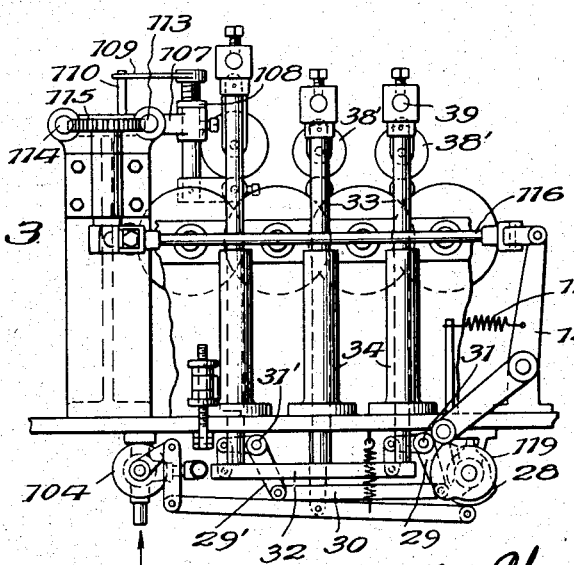
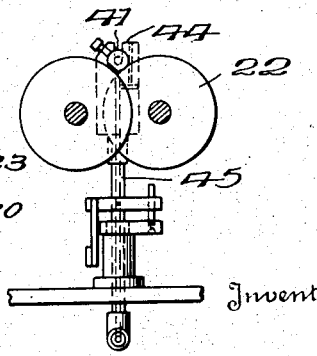
Inventor
Jakob Dichter,
By Charles B. Belknap
Attorney Dec. 24, 1940. J. DICHTER 2,226,303
VIAL FORMING MACHINE
Filed June 21, 1938 2 Sheets-Sheet 2
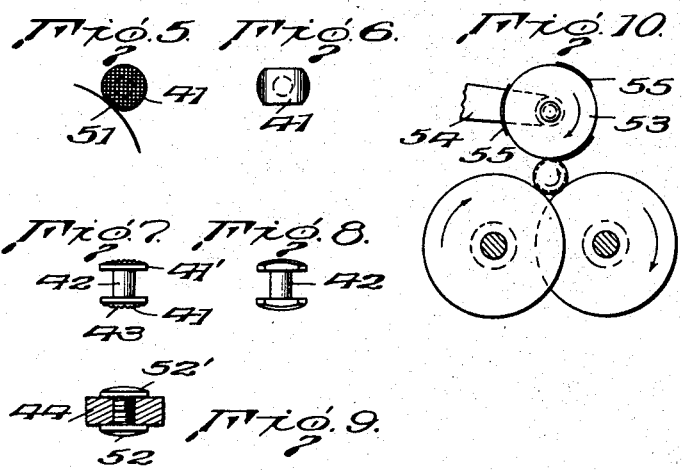
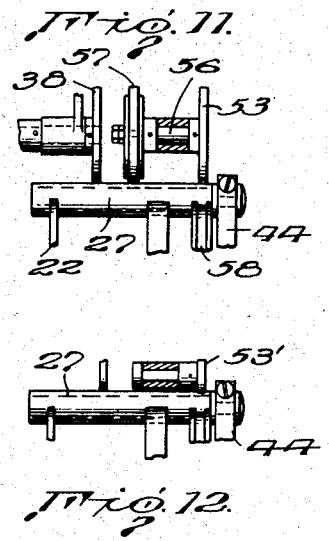
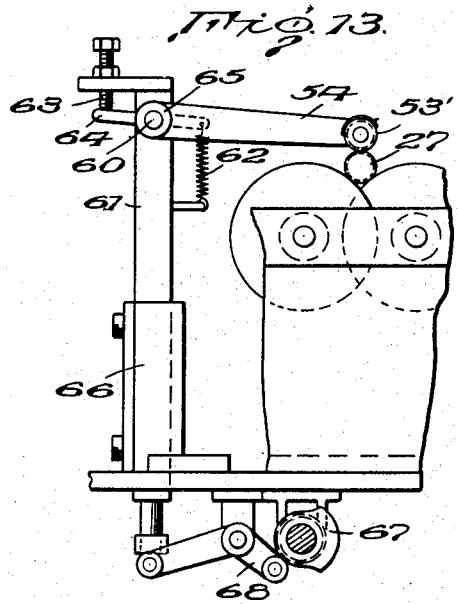
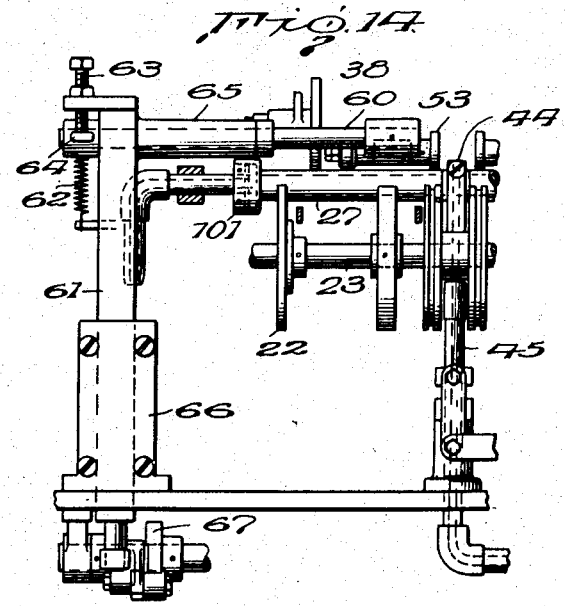
Inventor
Jakob Dichter,
By Charles B. Belknap
Attorney Patented Dec. 24, 1940

2,226,303

UNITED STATES PATENT OFFICE 2,226,303

VIAL FORMING MACHINE

Jakob Dichter, Berlin-Schoneberg, Germany

Application June 21, 1938, Serial No. 215,008
In Germany July 1, 1937

5 Claims. (Cl. 49—22)

The present invention relates to glass shaping apparatus and more particularly to a machine in which the closed ends of glass receptacles are reformed by forcing the heated closed portion against molds.

The improvement over known machines consists in a suitable mechanism for moving the glass receptacle into engagement with the mold and in the novel construction of the latter. One of the objects of the invention is to provide mechanism for manipulating receptacle bodies which are subdivided by melting into two portions, each of which is closed at one end, and after being subsequently heated for re-forming, are moved to a re-forming station in such manner that the open ends of the receptacles are connected with blower heads. The blower heads, together with the receptacles, are then moved with respect to the receptacle supporting means, comprising rollers, into engagement with the mold. Other rollers disposed above and opposite the supporting rollers exert a continuous pressure on the receptacle and are so arranged that they urge the receptacle axially relatively to and toward the blower head. A firm and accurate cooperation of the receptacle and blower head is thus assured because, when the movement of the blower head is in a direction toward the mold, it presses against the receptacle opening, and close fitting of the receptacle in the mouth of the blower head is also further increased by the axial pressure imposed on the receptacle by the upper counter-rollers. When the blower head is moved away from the receptacle after the bottom of the receptacle has been shaped, the two upper traction rollers move the glass receptacle away from the mold, the resistance of the blower head having been removed.

As shown on the drawings, the apparatus for simultaneously moving the blower head and the glass receptacles with respect to the roller supports is so constructed that the receptacles are moved axially into cooperation with the center of the blower head, so that the head is engaged and rotated by the positively rotated receptacle. An adjusting mechanism is provided by means of which the blower heads and the receptacle are moved a predetermined distance into engagement with the bottoming mold.

It is another object of the invention to provide a bottoming mold for simultaneously shaping two closed tube halves, the mold being so disposed in a support that the bottoming parts are easily interchangeable. In order to avoid excess heating and resultant sticking of the mold to the glass receptacles, the mold plates are cooled, the support for the mold plates being cooled by forcing therethrough air or other cooling agent, so that the mold support conducts heat from the mold plates. The mold plates are so constructed that they may consist either of two plates connected by a web which are inserted as a unit and retained in the support, or they may be separate plates adapted to be inserted individually in the support. The bottom plates are furthermore adjustable vertically with respect to the glass receptacle and are so arranged that they may also be adjusted axially with respect to the receptacle.

It is a further object of the invention to provide means for molding the side wall of the receptacle.

As shown on the drawings, the side molds consist of rollers having the same axial relation and diameter as the bearing rollers which rotate the glass tubular member. When such a mold is employed, the bottom plates should not have a diameter greater than that of the glass receptacle being shaped.

In order to be able to bottom receptacles of different diameter with the same mold plate, the diameter of the plate is preferably greater than that of the glass blank to be shaped, and that portion of the bottoming plate which engages the side mold roller is flattened.

Still another object of the invention is to so form the contact surface of the bottoming plate that it is interrupted, for example, by recesses or grooves. This form of mold plate is particularly advantageous since it reduces the surface contact with the glass and permits air to escape, thus producing a smoother and more even bottom, in contrast to one which is shaped by a continuous surface.

It is also an object of the invention to form letters, decorations, or other markings on the side wall of the receptacle while the bottom thereof is being shaped. For this purpose, a mold, preferably in the form of a roller and bearing peripheral dies or other markings, is urged against the glass, so that, when air is blown into the receptacle, the wall assumes the form of the markings on the roller. The markings can be provided on the roller either in relief or intaglio. The roller mold provided with markings should have a predetermined ratio to the diameter of the receptacle, so that the periphery of the roller mold is developed on the receptacle when air is forced into the receptacle. The inscription may be made simultaneously with the bottom shaping operation or independently thereof as a separate operative step. By so proportioning the diameters of the mold and receptacle, continued rotation of the impression mold will not affect registration of the die with the part of the receptacle to be provided with the impression. If desired, the impression roller may be provided with markings which have a contact surface approximating a straight line. Consequently, the periphery of the roller mold is a multiple of the receptacle circumference and is thus provided with as many markings as the multiple, so that the markings are developed in the reshaping of the receptacle.

The mold roller provided with the markings may be extended on one or both sides of the impression so as to act as a lateral supporting member; or the roller may contain only the impression, in which case there may be provided an oppositely positioned roller supporting the wall of the blank on both sides of the impression, said supporting roller having a reduced diameter opposite the impression.

The mold roller provided with markings may be rotated frictionally by the glass receptacle, or rotated by separate drive means. As shown in one form of the invention, the impression roller may be rotated by means of a friction roller disposed laterally of and on the same shaft as the mold roller.

A preferred embodiment of the invention is illustrated in the accompanying drawings, in which:

Fig. 1 is a front elevation of the means for moving the blower head and illustrating the relative positions of the bottom mold plate support and the blower heads;

Fig. 2 is a plan view of the machine shown in Fig. 1;

Fig. 3 is a side elevation of the machine;

Fig. 4 is a side elevation of the mold support;

Fig. 5 is a fragmentary side elevation of a bottom plate and one of the rollers supporting the side walls;

Fig. 6 is a side elevation of a modified form of mold plate;

Figs. 7 and 8 are plan views of the plates shown in Figs. 5 and 6;

Fig. 9 illustrates the manner in which two opposite bottom plates are secured to the support;

Fig. 10 is a side elevation of a mold roller provided with markings and which is larger than the glass receptacle;

Fig. 11 is a front elevation of a mold roller driven by a friction roller;

Fig. 12 illustrates a mold roller having the same diameter as the glass receptacle;

Fig. 13 is a side elevation of mechanism for urging the mold roller against the glass blank; and Fig. 14 is a front elevation of the mechanism shown in Fig. 13.

In the drawings there is illustrated only that part of the machine designed to bottom the receptacle, the invention being adapted not only to reshaping apparatus of the type in which the glass tube sections of double length are preliminarily subdivided by melting into two halves, but also where single blanks are shaped, or in apparatus where the blanks pass through several other melting stations and finally to the bottoming mechanism, as shown on the drawings.

Mounted on the frame 21, in bearings 24, are shafts 23 to which are fastened discs 22 providing a rotatable support and adapted to rotate the glass blanks 27, 27'. Disposed above the blanks are counter-pressure rollers 38, 38', which are skewed or mounted obliquely to the axis of the blanks so that they exert a pressure on the blanks axially thereof in the direction toward blower heads 101, 101', respectively. These rollers 38, 38' are mounted in the customary manner in supporting arms 39, 39' and are adapted to be raised and lowered.

The means for raising and lowering the skew rollers comprises cam 28 having engagement with bell-crank lever 29, the latter being connected by link 30 with a second bell-crank lever 29', both levers being fulcrumed on the machine frame as at 31, 31'. The levers are also connected to cross-member 32 forming a support for the lower ends of rods 33 reciprocable in guides 34 and to which arms 39 are adjustably connected. It will, therefore, be seen that the rods 33 and arms 39 are periodically elevated and lowered to alternately disengage and engage the glass blanks.

The blower heads are rotatable about the open ends of conduits 102, 102', and, when the open ends of the blanks are brought into engagement with the heads, are rotated by the blanks. The blower heads 101, 101' have packed connections with the conduits 102, 102'. The latter are connected through passages 103, 103' with an air supply controlled by a cam-actuated valve 104, through which the air is admitted at predetermined periods into the blank.

Each conduit member 102, 102' carrying a blower head is attached to a block 105 which, in turn, is attached to a supporting rod 106 threaded at the upper end and slidable in guide 107, vertical adjustment of the rod being possible by turning threaded sleeve 108 which cooperates with the threaded end of the rod. Each rod 106 is adapted to be moved laterally by a lever 109 which is slidably connected to a pin 110. Each guide 107 has two bearings, indicated at 111, 111', 112, 112', slidably mounted on rods 113 and 114, the latter being dentated to form rack teeth at one end thereof. The rack portions of rods 113, 114 mesh with a gear 115 which, through a cam-actuated rod mechanism 116, is adapted to be oscillated so that it actuates both rods 113, 114, but, since the racks are on diametrically opposite sides of the gear, the rods are reciprocated in opposite directions. Bearing 111 is connected with an arm 117 by means of a threaded member 118 to provide for adjustment of the distance between the arm and bearing. Likewise, bearing 111' is connected with the lever 117' in a similar manner by means of a threaded member 118'. Lever 117 is secured to rod 114, while bearing 111 is adapted to slide on rod 113, and bearing 111' is attached by means of lever 117' to rod 113. Bearings 112, 112' serve as guides when the two rods 113, 114 are moved in opposite directions by the gear 115, it being obvious, as shown in Fig. 2, that blower head 102' is moved to the right and head 102 is moved to the left. Also, as shown in Fig. 2, rod 116 is moved in the direction of the arrow by means of a traction spring 123, and is moved in the opposite direction by cam 119, shown in Fig. 3, through lever 120. Movement of the guide rods 113, 114 and blower heads 101, 101' from the open receptacle mouth, is regulated by means of screw 121 on rod 114 and engageable with the frame of the machine so that these blower heads can be brought into line with abutments 112 limiting the position of the receptacle mouths and which abutments, on passage of the receptacles through the machine, hold them in proper position with respect to the heating flames.

As shown in Figs. 5 and 7, the mold plates 41, 41' are preferably connected by a web 42 and the face of each plate provided with recesses 43 to permit limited engagement of the blank and shaping faces of the plates, thus reducing surface contact between the blank and plates and also permitting the escape of air from the plate face during the shaping operation. The connected plates are mounted in support 44, as indicated in Fig. 4, the latter being cooled by the passage of air forced through passage 45 therein. The bottom plates and the support are adjustable vertically by means of a lever 46 pivoted to the frame at 47 and connected at one end to the support as at 48. The other end of the lever is connected to nut 49 threadedly to engage bolt 50 fixed to the frame.

It is to be noted that the periphery of the mold plates is flattened as at 51 when the mold lies in the same plane as one of supporting discs 22. The purpose of this will be explained hereinafter.

In Figs. 6 and 8, another form of connected bottoming plate is shown. In this type of plate, the shaping faces are smooth and convex, but the periphery is flattened at opposite sides to provide for limited engagement of the blank and plate so as to reduce surface contact and diminish heat transfer to the plate.

Fig. 9 illustrates a pair of separate bottoming plates 52, 52', each threaded and adapted to be screwed into support 44.

In Fig. 10 there is shown a roller mold 53 supported on a vertically swingable arm 54 and having on its periphery a plurality of dies 55 adapted to impress decorations or lettering on the side wall of the blank 27 while the latter is heated. In the drawings, the impression roller has a diameter which is a multiple of the diameter of the blank, in the form illustrated being three times as great. There are, therefore, three impression dies so spaced that, regardless of the number of rotations of the die roller, the respective impressions made on the wall of the blank will all register. These impressions may be either relief or intaglio.

Fig. 11 shows one method of rotating the impression roll. Here the impression roll is secured to shaft 56 to which is also secured a friction disc 57 having a diameter equal to that of roll 53 and adapted to be rotated by engagement thereof with the blank. It is to be noted that a supporting roll is provided opposite the impression roll, the supporting roll having a reduced diameter or groove 58 so as not to engage that portion of the blank engaged by the impression roll. If the peripheral surface of the rotary mold is adjacent the end of the vial, the supporting roller extends axially beyond the end of the vial, in which case the bottom mold is flattened at 51 as shown in Fig. 5.

In Fig. 12 there is shown a modified form of impression roll 53' having a diameter equal to that of the blank. Here the impression roll receives its rotation from the rotating blank.

The means for lifting the impression roll are shown in Figs. 13 and 14. The roll is journaled at one end of arm 54, the other end of which is fast on shaft 60 supported in a bearing forming part of bracket 61. Normally arm 54 is urged downwardly by spring 62, but is limited in its movement by adjustable stop 63 engaging finger 64 on collar 65 secured to shaft 60. Bracket 61 is slidably mounted for vertical reciprocation in guide 66 on the machine frame and at predetermined periods is elevated by cam 67 acting on lever 68 having connection with the bracket. Upon elevation of the bracket, the impression roll is moved out of engagement with the blank.

From the foregoing description of the invention it will be obvious that when the glass blank is heated it is moved axially against the bottoming plates and, if desired, the impression roller is brought into molding relation with the blank so that the roller forms markings in the side wall of the blank. Air is then forced into the blanks through the blower heads to insure full contact of those portions of the blank to be shaped with the shaping molds. After the shaping operation, the blower heads, skew discs, and wall molds are withdrawn to permit removal of the blank.

While a preferred embodiment of the invention has been shown and described, it is not intended that the invention be limited to the exact arrangement of parts disclosed in the drawings.

What I claim as my invention is:

1. Apparatus of the class described, comprising means for supporting and rotating a vial to be bottomed, a bottoming mold plate, said plate comprising a circular disc having a portion of its periphery flattened, a rotary mold for shaping the side wall of the vial adjacent the bottom of the vial, said supporting means being in juxtaposed relation to said flattened portion, a head adapted to fit over one open end of the vial to be bottomed, means for supplying air to said head, and means for moving said head in the direction of said mold plate to urge the other end of the vial into engagement with said plate thereby to bottom the vial.

2. Apparatus of the class described, comprising means for supporting and rotating a vial to be bottomed, a bottoming mold plate, said plate comprising a disc having a shaping surface provided with a plurality of recesses in the face thereof, a head adapted to fit over one open end of the vial to be bottomed, means for moving said head in the direction of said mold plate to urge the other end of the vial into engagement with said plate thereby to bottom the vial, and means for supplying air to said head while the vial is in engagement with said mold plate.

3. Apparatus of the class described, comprising means for supporting a pair of vials to be bottomed in axial alignment, a pair of spaced axially aligned blower heads adapted to fit over the open ends of the vials, a bottoming mold disposed between the vials, said mold comprising two oppositely disposed mold plates and a support therefor, means for simultaneously moving said heads in the direction of said mold thereby to bottom the vials including a pair of parallel reciprocable rods, means for simultaneously moving said rods in opposite directions, and means for supplying air to said heads while the vials are in engagement with said mold plate.

4. Apparatus of the class described, comprising means for supporting and rotating a vial to be bottomed, a bottoming mold plate, a rotary mold in contiguous relation to said mold plate for shaping the side wall of the vial, a head adapted to fit over one open end of the vial to be bottomed, means for moving said rotary mold into engagement with the vial and simultaneously moving said head in the direction of said mold plate to urge the other end of the vial into engagement with said plate thereby to bottom the vial, and means for supplying air to said head while the vial is in engagement with said mold plate.

5. Apparatus of the class described, comprising means for supporting a vial to be bottomed, a blower head adapted to fit over the open end of the vial, means for supplying air to said blower head, valve means adapted to control the admission of air to said air supplying means, a bottoming mold, means for moving said blower head to urge the bottom end of the vial into engagement with the mold, and cam means for actuating said head moving means and valve in timed relation.

JAKOB DICHTER.